Oct. 16, 1962 M. W. LOVELAND ETAL 3,058,618
FRUIT FEEDING DEVICE
Filed Jan. 3, 1961 2 Sheets-Sheet 1

INVENTORS
MALCOLM W. LOVELAND
ROLAND F. BLAKEWELL
BY
ATTORNEYS

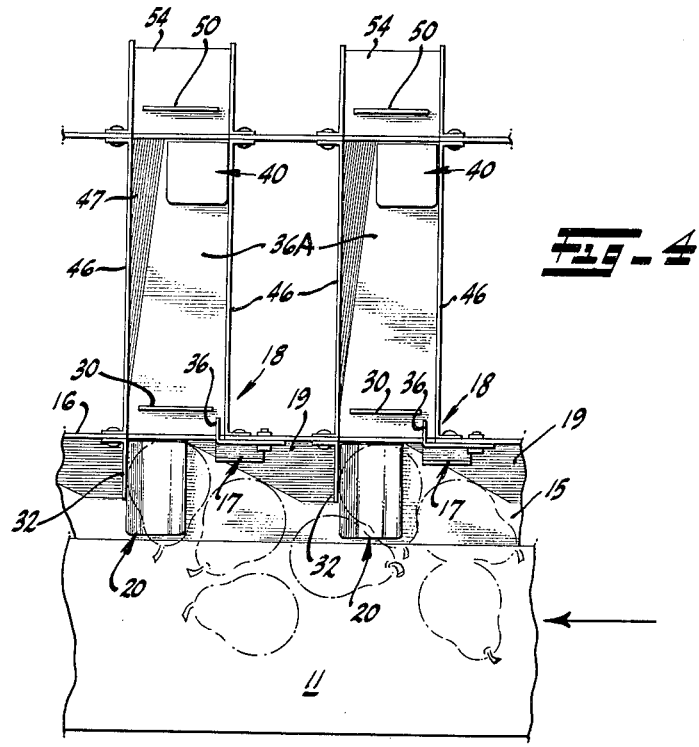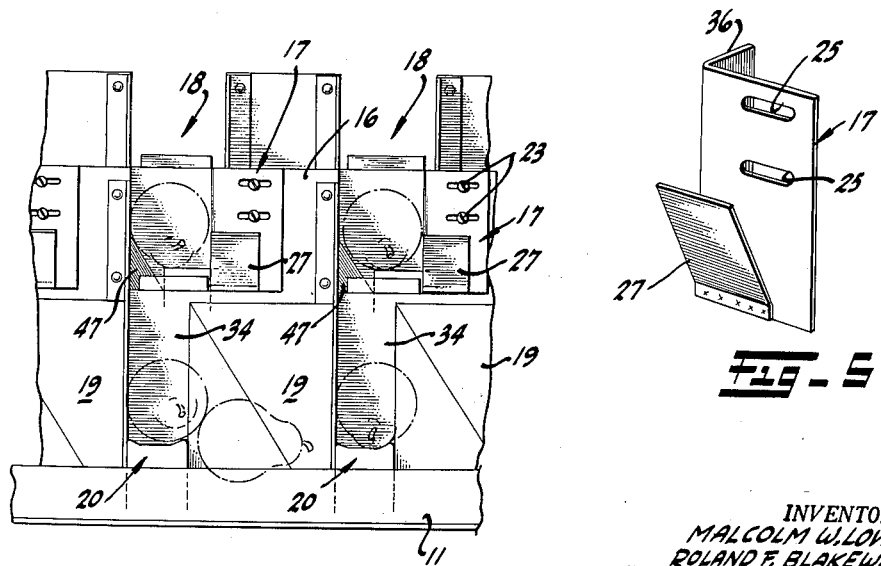

United States Patent Office 3,058,618
Patented Oct. 16, 1962

3,058,618
FRUIT FEEDING DEVICE

Malcolm W. Loveland, Orinda, and Roland F. Blakewell, Oakland, Calif., assignors to Atlas Pacific Engineering Company, a corporation of California
Filed Jan. 3, 1961, Ser. No. 80,066
1 Claim. (Cl. 221—238)

This invention relates to an improved feeding device, particularly one suited to the feeding of articles of random size such as pears one at a time from a bulk supply.

The machines presently available for peeling and coring a pear customarily include a cup which receives a pear and then moves to impale the pear upon a rotatable spindle. While so mounted, the pear is peeled and a core is cut in the pear to remove the seed ceil. Heretofore, such machines have been fed by hand, a relatively costly and tiresome occupation. Because the machines are handfed, the rate of processing pears is relatively low as compared to that possible in machine feeding.

Pears are relatively difficult to feed because they vary in shape and size. Also, because of their irregular shape, pears act in an erratic and unpredictable manner. For example, two or three pears may bunch together and form a relatively solid mass with the several stem-ends of the pears intertwined with the butt ends of the other pears. These will act as a unitary mass and so make difficult the feeding of one pear at a time.

We have found that it is possible to feed pears one at a time in single file from a bulk supply by practicing what we term "double feeding." To accomplish this, we first separate not more than a few pears from the mass. The so separated few pears are then in turn separated from one another so that the several pears involved are placed in single file and are fed one at a time. In this manner, the uncertainties occasioned by the irregular size and shape of the pears are eliminated and positive feeding of one pear at a time is achieved.

It is in general the broad object of the present invention to provide an improved feeder for articles such as pears and the like, to provide a succession of pears one at a time for subsequent handling in a processing machine.

An additional object of the present invention is to provide a pear feeding device including means for separating a few pears from a bulk supply thereof and then for feeding the several so separated pears one at a time to a pear processing machine.

The invention includes other objects and features of advantage, some of which, together with the foregoing, will appear hereinafter wherein the present preferred embodiment of the pear feeding device of this invention is disclosed.

In the drawings accompanying and forming a part hereof:

FIGURE 4 is a top view showing a portion of the feeding apparatus.

FIGURE 5 is a perspective view of the element utilized to restrict the passage of one article at a time.

FIGURE 6 is a front view showing a portion of the feeding apparatus.

Figure 1:
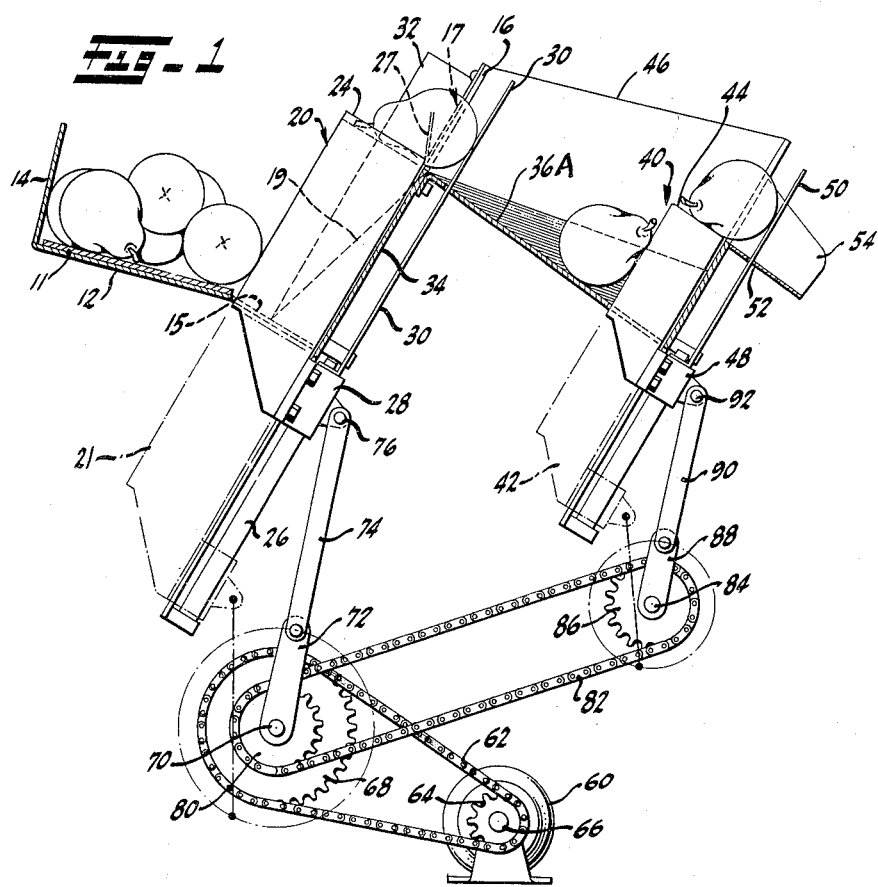
FIGURE 1 is a side elevation, partly in section, showing the feeding mechanism of the present invention.

Referring particularly to FIGURES 1 and 4, fruit to be fed is taken from a suitable bulk by a movable conveyor belt 11 which moves over a fixed planar support 12. The fruit is confined upon the belt by an upwardly extending side wall 14. The support 12 and its accompanying conveyor belt 11 are supported at a slight acute angle to the horizontal so that the fruit tends to roll to the right in FIGURE 1 across the shelf 15 toward end wall 16 provided at an acute angle to the vertical. At suitable spaced intervals along the wall 16, fruit feeding stations, each generally indicated at 18, are provided.

The shelf 15 is at an angle downwardly from belt 11 so that fruit rolling off the belt rolls across the shelf. To guide the fruit across the shelf to a feeding station 18, sloping guides 19 are provided between stations, as appears in FIGURE 4. To regulate the volume of fruit which can approach a station 18, an adjustable guide 17 is provided (FIGURES 4, 5 and 6). The guide will be further described. It is adjustably mounted by bolts 23 on wall 16, the bolts being passed through slots 25 in the guide. Mounted on the front of the guide 17 is a plate 27 extending upwardly and outwardly over the adjacent sloping guide 19 to restrict the number of articles lifted above the guide 19.

Each article feeding station includes a plunger generally indicated at 20 reciprocated back and forth over a path between a lower position 21 in which the top of the plunger 20 is slightly below the level of the conveyor 12 and a raised position indicated by the solid line position of the plunger as shown at 24 in FIGURE 1. The top of each plunger includes a flat portion 22 provided between upwardly raised sloping side walls 29.

Each plunger 20 is supported upon a suitable guide structure, generally indicated at 26, and which extends upwardly at an acute angle to the vertical, the plunger being mounted upon a slideable carriage 28 movable on the guide 26. Also mounted upon the carriage 28 in spaced relation to the top of a plunger is a plate 30 which acts as a first gate to control the release of articles from off plunger 20. Mounted on each side of the plunger are guide plates 32 defining generally the size of any article carried upon the top of the plunger and to be discharged. Also controlling the size of an article capable of discharge off the top of the plunger is extension 36 on adjustable guide 17. The extension is positioned parallel to one of the guide plates 32 and normal to the cooperating plate or gate 30. Each plunger is movable over a portion 34 of the wall 16, the fruit being raised by the plunger as it is raised upwardly from the lower position of the plunger at 21 to the upper terminal position at 24. A downwardly extending guide plate 36A is provided at the upper terminal position 24 of the plunger to guide fruit downwardly.

Figure 2:
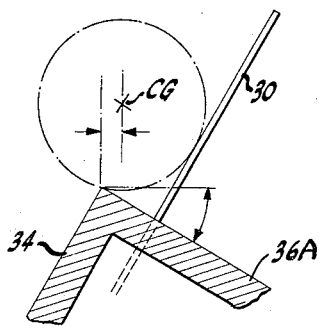
FIGURE 2 is a diagrammatic representation of the relation of one of the feeding plungers to a typical article being fed.
Figure 3:
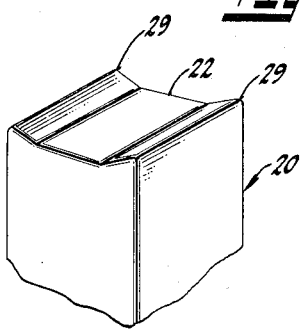
FIGURE 3 is a perspective view of the top portion of one of the feeding plungers employed in the apparatus for feeding articles.

As is shown in FIGURE 2, the relation of the guide plate 34 and the downwardly extending guide plate 36A is such that, as the support provided by the plunger is withdrawn, the fruit rests stably on the plate 36A and against plate or first gate 30. The latter is provided in such relation to the plate 36A that the article will tend to slide along the plate 36A once the support of the plate or first gate 30 is withdrawn. This is because, as appears in FIGURE 2, the center of gravity of the fruit is generally past a vertical plane passing through the junction of guide plate 34 and the downwardly sloping plate 36A. In this manner, if one or more articles are withdrawn from the bulk supply provided by the conveyor belt 12, any unstably supported article will drop back into the bulk supply on the shelf 15 and generally only one article at a time will be present upon the top of the plunger 20, unless the fruit is very small, in which case there may be two. The so supported article will rest against the plate or first gate 30 and will be released once that plate is withdrawn, the article then sliding upon the plate 36A to a second feeder.

To receive an article sliding upon the plate 36A, a second plunger structure 40 is provided. This has the similar top support as has plunger 20, plunger 40 being reciprocated between a lower position indicated at 42 in FIGURE 1 to an upper raised position shown in full lines at 44 in FIGURE 1. Fruit supported upon the plate 36A is confined by the side guide walls 46 and by the inwardly sloping guide 47 which directs one article at a time to the plunger 40. Plunger 40 is carried upon a suitable carriage generally indicated at 48 which also carries plate 50 in spaced relation, the latter reciprocating through a slot 52 in downwardly extending chute 54 and acting as a second gate to control the release of an article.

The plungers are preferably but not necessarily reciprocated in a timed relation such that both plungers are raised simultaneously into the full line position shown in FIGURE 1, and both are simultaneously lowered to the dotted line position. To effect this, for example, a suitable prime mover 60 is provided, a chain 62 being trained about sprocket 64 on shaft 66 of the prime mover 60. Sprocket 68 is mounted upon a shaft 70, the latter carrying a lever arm 72 which rotates with the shaft 70. The arm 72 carries a connecting link 74 pivoted at 76 on the carriage 28 to reciprocate the latter between the full line and dotted line positions of FIGURE 1. Also mounted upon the shaft 70 is a sprocket 80, about which is trained a chain 82, the latter extending about a sprocket 86 mounted upon a shaft 84. A lever arm 88 is mounted upon the shaft 84 to reciprocate link 90, the latter in turn being pivoted at one end upon carriage 48 at connection 92. In this manner, both plungers are reciprocated back and forth between the full line position and the dotted line position of FIGURE 1.

The function of the plunger 20 is to separate one or two items at a time from the bulk supply provided upon the conveyor belt 12. Usually only one article will be supplied and will be permitted to pass by plate 30. However, if two items do pass the plate 30 through the chute provided by walls 46, these in turn will be segregated by the action of plunger 40 and only one article at a time will be fed past plate or second gate 50 into chute 54 and into a suitable receiving mechanism such as the cup 177 of a pear processing machine as shown in U.S. patent application Serial No. 766,579 filed October 10, 1958.

In selecting the size of the plunger 20, the plunger width between walls 29 is generally such that the plunger will accommodate any large article to be fed, yet will not provide support for any two of the smallest articles. The depth of the plunger, that is, the distance along one of the walls 29, is such that two of the smallest articles will be supported or one of the larger articles and this regardless of the position of the article on the plunger.

To prevent more than two small articles from resting on the top of the plunger 20, the wall 32 should project from the wall 16 such a distance that support is provided for the largest article, yet two small articles cannot rest on the top of the plunger.

Pears are particularly troublesome to handle because of an inherent capacity for bridging. While other fruits will bridge to some extent, this is most noticeable with pears, particularly when fed in random sizes. Pears will vary as much as from 1.5 inches minimum diameter to nearly 4 inches maximum diameter with an overall length varying from 1¾ inches to 5 inches. By observing the foregoing teachings on the plunger sizes and relationships, one can provide a successful pear feeder.

Obviously, the apparatus shown can be used for feeding of a wide variety of articles such as pears, peaches, apples and the like automatically and from a bulk supply, but one item at a time is supplied to a suitable receiving station for processing in a subsequent processing apparatus.

We claim:

An article feeding device for randomly sized articles which are capable of rolling under the influence of gravity comprising:

(a) a reservoir for said articles, said reservoir having a base inclined to the horizontal whereby to permit said articles to roll in one direction, said reservoir having a discharge station at the lowermost end thereof, said discharge station being of a width in excess of the maximum dimension of the largest of said randomly sized articles to be fed;

(b) a first plunger with a generally horizontal surface positioned at the discharge station and reciprocatable from a first position at which the said surface of said plunger is at a level not in excess of the level of the discharge station of said reservoir to a second position above the said first position, said plunger being only wide enough to support a single of said randomly sized articles thereacross but deep enough to support two of said articles;

(c) a wall extending generally vertically along the path of travel of said plunger on the side of the said plunger opposite said reservoir discharge station, said wall extending from said first position to said second position;

(d) a guide immediately above the level of the surface of said plunger when said plunger is in said first position, said guide extending outwardly from said wall in the direction of the reservoir, said guide being spaced sufficiently far from the said plunger to permit the plunger to pass without impediment but sufficiently close to the said plunger to prevent more than a single of the said articles from contacting both said wall and said plunger simultaneously;

(e) a downwardly-inclined chute for receiving said articles from the said plunger at the second position for transfer downwardly, said chute having a loading end and a discharge end at a lower level than said loading end;

(f) a gate moveable with the said first plunger across the loading end of the said chute to retain temporarily an article discharged by the said first plunger while the said first plunger is in the said second position, said gate being spaced from said plunger a distance great enough, when said plunger is in said second position, to permit the largest of said randomly sized articles to be supported by said loading end of said chute while said plunger is returning to said first position and before said gate is entirely removed from said chute but insufficiently great to permit two of the smallest of said randomly sized articles to be supported thereby;

(g) a second plunger at the discharge end of the said chute, said second plunger being reciprocable from a first position at which said plunger is at a level not in excess of the level of the discharge end of the said chute to a second position above the said first position, said plunger being only wide and deep enough to support a single of said randomly sized articles thereacross;

(h) a wall extending generally vertically along the path of travel of the said second plunger on a side thereof at the discharge end of the said chute, said wall extending from the said first position of the said second plunger to the said second position of the said second plunger;

(i) a downwardly-inclined chute for receiving said articles from the said second plunger at the second position for transfer downwardly, said chute having a loading end and a discharge end at a lower level than said loading end;

(j) a gate moveable with the said second plunger across the loading end of the said chute to retain temporarily an article discharged by the said second plunger while the said second plunger is in the said second position, said gate being spaced from said plunger a distance great enough, when said plunger is in said second position, to permit the largest of said randomly sized articles to be supported by said loading end of said chute while said plunger is returning to said first position and before said gate is entirely removed from said chute but insufficiently great to permit two of the smallest of said randomly sized articles to be supported thereby.

References Cited in the file of this patent

UNITED STATES PATENTS

| | | |
|---|---|---|
| 488,084 | Miner | Dec. 13, 1892 |
| 1,293,153 | Mandzuk | Feb. 4, 1919 |
| 1,352,411 | Hutton | Sept. 7, 1920 |
| 2,108,694 | Smith et al. | Feb. 15, 1938 |
| 2,284,975 | Horner | June 2, 1942 |
| 2,565,275 | Snowfield | Aug. 21, 1951 |
| 2,709,014 | Soles | May 24, 1955 |
| 2,824,665 | Lamouria | Feb. 25, 1958 |